US006704557B1

United States Patent
Krishnamurthy et al.

(10) Patent No.: US 6,704,557 B1
(45) Date of Patent: Mar. 9, 2004

(54) SYSTEM AND METHOD FOR PROTECTING A RECEIVER FROM JAMMING INTERFERENCE

(75) Inventors: Sreenath Krishnamurthy, Randolph, NJ (US); Chun Chieh Kung, Randolph, NJ (US); Kun-Yii Tu, Summit, NJ (US)

(73) Assignee: Lucent Technologies Inc., Murray HIll, NJ (US)

( * ) Notice: Subject to any disclaimer, the term of this patent is extended or adjusted under 35 U.S.C. 154(b) by 0 days.

(21) Appl. No.: 09/296,252

(22) Filed: Apr. 22, 1999

(51) Int. Cl.[7] .................. H04B 1/10; H04B 15/00; H04B 1/06; H04B 7/00; G01S 5/02
(52) U.S. Cl. ............ 455/278.1; 455/63.1; 455/296; 455/276.1; 455/272; 342/417; 342/422; 342/368
(58) Field of Search ................ 455/296, 63, 67.3, 455/303, 272, 273, 275, 276.1, 277.1, 277.2, 278.1, 280; 342/380, 383, 378, 417, 422, 386

(56) References Cited

U.S. PATENT DOCUMENTS

| | | | | |
|---|---|---|---|---|
| 4,075,566 A | * | 2/1978 | D'Arcangelis | 455/276.1 |
| 4,293,955 A | * | 10/1981 | Gehr et al. | 455/276.1 |
| 4,298,873 A | * | 11/1981 | Roberts | 342/375 |
| 4,326,294 A | * | 4/1982 | Okamoto et al. | 455/139 |
| 4,384,366 A | * | 5/1983 | Kaitsuka | 455/278.1 |
| 4,388,723 A | | 6/1983 | Keen | |
| 4,498,083 A | * | 2/1985 | Gutleber | 342/380 |
| 4,498,885 A | * | 2/1985 | Namiki | 455/273 |
| 4,500,883 A | * | 2/1985 | Gutleber | 342/383 |
| 4,651,155 A | * | 3/1987 | Baurle et al. | 342/378 |
| 4,736,455 A | * | 4/1988 | Matsue et al. | 455/138 |
| 4,780,721 A | | 10/1988 | Dobson | |
| 4,969,211 A | * | 11/1990 | Raymond | 455/277.1 |
| 5,093,667 A | | 3/1992 | Andricos | |
| 5,107,273 A | | 4/1992 | Roberts | |
| 5,117,505 A | * | 5/1992 | Talwar | 455/278.1 |
| 5,152,010 A | * | 9/1992 | Talwar | 455/136 |
| 5,218,359 A | * | 6/1993 | Minamisono | 342/383 |
| 5,317,322 A | * | 5/1994 | Grobert | 342/378 |
| 5,548,837 A | * | 8/1996 | Hess et al. | 455/278.1 |
| 5,579,016 A | * | 11/1996 | Wolcott et al. | 342/378 |
| 5,926,135 A | * | 7/1999 | Minkoff | 342/379 |
| 5,940,033 A | * | 8/1999 | Locher et al. | 342/378 |
| 6,181,924 B1 | * | 1/2001 | Eklund et al. | 455/296 |
| 6,201,955 B1 | * | 3/2001 | Jasper et al. | 455/277.2 |

FOREIGN PATENT DOCUMENTS

| | | |
|---|---|---|
| GB | 2 323 969 | 7/1998 |
| WO | WO98/09372 | 3/1998 |

OTHER PUBLICATIONS

Henry Bachman, "Smart Antennas—The Practical Realities", GEC–Marconi Hazeltine, 1997 Annual Review of Communications.
European Patent Office Search Report dated Jun. 11, 2003.

* cited by examiner

*Primary Examiner*—Vivian Chin
*Assistant Examiner*—Raymond B. Persino (57) ABSTRACT

An interference protection system includes a receiving section for receiving an electromagnetic signal, a detector for detecting a jamming signal, and a control system for orienting a changeable null direction of an antenna system to reduce interference in a receiver from the jamming signal.

34 Claims, 8 Drawing Sheets

SYSTEM AND METHOD FOR PROTECTING A RECEIVER FROM JAMMING INTERFERENCE

FIELD OF THE INVENTION

The invention relates to a system and method for protecting a receiver from jamming interference that may be present in a wireless communications system.

BACKGROUND OF THE INVENTION

Wireless communication systems include digital communication systems, such as code-division multiple-access (CDMA), time-division multiple-access (TDMA) and Global System for Mobile Communications (GSM), and analog communication systems, such as the Advanced Mobile Phone Service (AMPS). Communications systems are often designed assuming the absence of malicious transmissions, jamming transmissions, or other electromagnetic interference that could disrupt normal communication traffic carried by the communications system.

A jamming signal transmission typically features a sufficiently strong signal strength to saturate radio frequency circuitry of a receiver. A jamming signal may include either a transient signal transmission (e.g., pulse) or a continuous transmission. A microwave signal blast within a receive bandwidth of the receiver is an example of a jamming signal. Such a microwave signal blast can temporarily disable the base station receiving function and crash an entire cell site that is otherwise operating reliably. If the jamming signal is sufficiently strong at different cell sites, communications at multiple cell sites may be disrupted.

In a CDMA system, power control of mobile stations is crucial to overall proper operation. More specifically, the transmit power levels of the mobile stations are controlled such that the interference between mobile stations is minimized and, in turn, system capacity is maximized. For effective power control in a CDMA system, jamming signals and interference from sources external to the communications system are assumed to be within tolerable limits. However, if the jamming signals or interference exceeds tolerable limits (e.g., as with ultra-strong jamming signals) the communications system, or a portion thereof, may fall into a temporary failure mode. During the temporary failure mode, calls may be dropped, access to the communications system may be denied, or communications may be disrupted.

One conventional interference reduction technique focuses on maximizing user capacity by rejecting undesired jamming signals through base-band signal processing within a receiver. However, the conventional interference reduction scheme may be ineffective because the received signal-to-noise ratio may be severely degraded in the receiver if a jamming signal with an ultra strong signal level disables normal operation of the radio frequency receiver. Thus, a need exists for an interference protection scheme that can reduce or eliminate the deleterious effects of ultra-strong jamming signals as well as jamming signals of lesser amplitude on receivers.

SUMMARY OF THE INVENTION

In accordance with the invention, an interference protection system is used with an antenna system to reduce the interference effects of a jamming signal. The antenna system is arranged to receive a desired signal, and is capable of producing a radiation pattern having a changeable null direction that may be directed toward an angle of arrival of a jamming signal to spatially filter out the jamming signal.

The present invention relates to an apparatus and method of using the antenna system for spatially filtering out the jamming signal. One aspect of the invention includes a detector and a controller that cooperate with the antenna system. The detector is capable of detecting a jamming signal received by the antenna system and distinguishing the jamming signal from the desired signal. The detector is adapted to produce a nonlinear signal (or another suitable signal) indicative of a received magnitude of the jamming signal. The controller is configured to control the antenna system based upon the nonlinear signal (or another suitable signal) produced by the detector. The controller controls the antenna system to spatially filter out the jamming signal from the desired signal by orienting the changeable null direction toward an angle of arrival of the jamming signal relative to the antenna system. The controller is adapted to vary the changeable null direction until the nonlinear signal is minimized, or otherwise reduced to an acceptable level, to spatially filter out the jamming signal from the desired signal.

The interference protection system can prevent the introduction of a jamming signal into a receiver, once the antenna system nulls the jamming signal in a transparent manner to users of the communications system. The interference protection system is well-suited for guarding against communication failures caused by ultra-strong jamming signals (e.g., a jamming signal exceeding −20 dBm at the antenna system), and jamming signals of lesser magnitude, because the receiver protection system allows a receiver to operate normally with minimal or no exposure to the jamming signal.

DETAILED DESCRIPTION OF THE PREFERRED EMBODIMENTS

Figure 1:
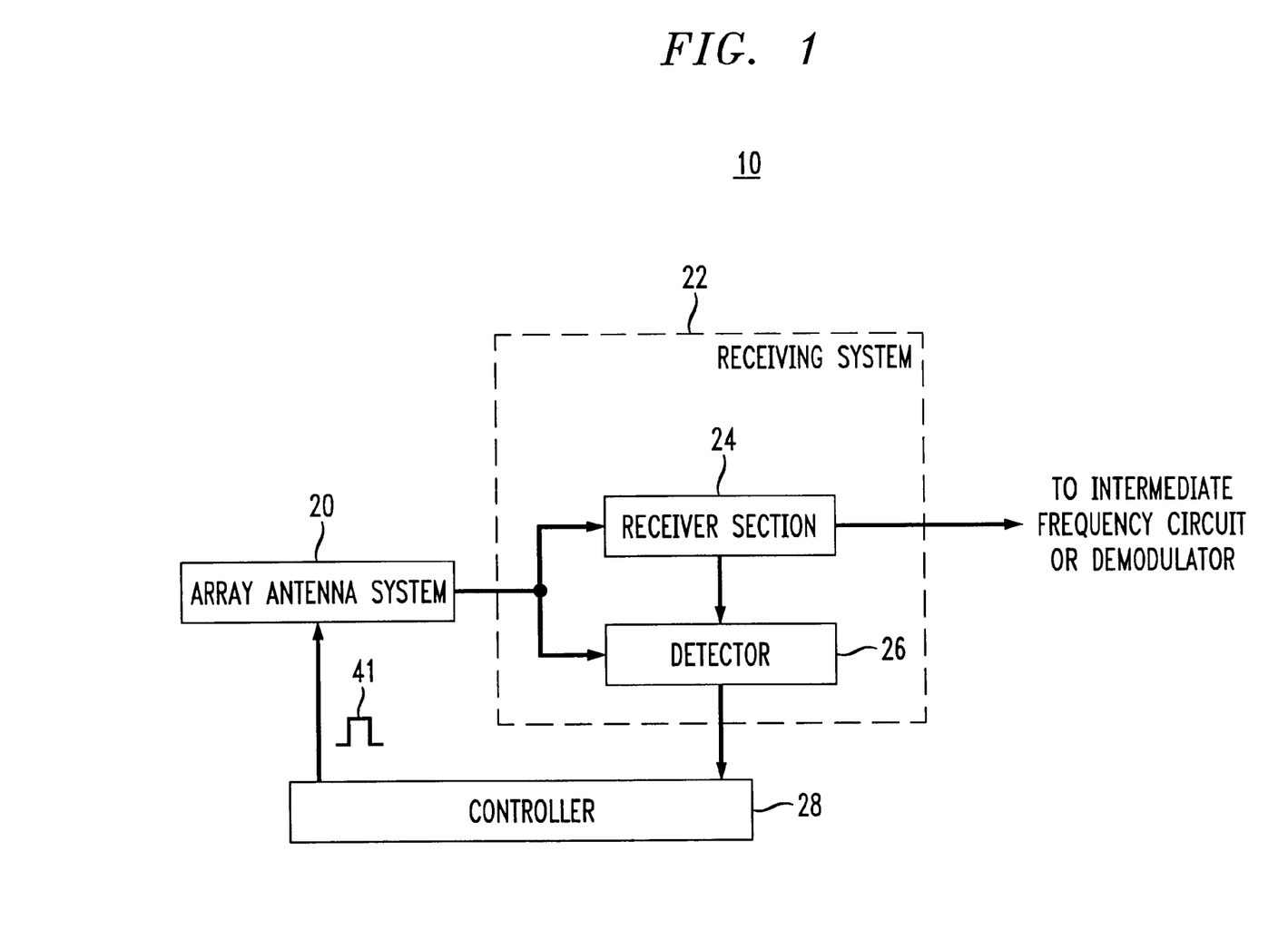
FIG. 1 is a block diagram of an interference protection system in accordance with the invention.

In accordance with the invention, an interference protection system 10 for a receiver reduces or eliminates radio frequency interference which may otherwise temporarily disrupt normal operation of a receiver at a wireless infrastructure site. In FIG. 1, the interference protection system 10 includes an antenna system 20 coupled to a receiving system 22, and a controller 28 coupled to the receiving system 22 and the antenna system 20. The receiving system 22 includes a receiving section 24 and a detector 26, each coupled to receive an input from the array antenna system 20. The detector 26 provides an output to the controller 28 and the receiving section 28 may provide an output to an intermediate frequency circuit or demodulator. The antenna system 20 is capable of producing a radiation pattern having a changeable null direction. The antenna system 20 is arranged to receive a desired signal (e.g., an uplink signal). The detector 26 is capable of detecting a jamming signal received by the antenna system 20.

The jamming signal represents interference that interferes with a desired signal because of the relative frequencies and relative amplitudes of the jamming signal and the desired signal. The relative frequencies and relative amplitudes are related in a manner that produces intermodulation products, co-channel interference, adjacent channel interference, unwanted radio frequency mixing interactions, or any other type of interference. A jamming signal typically originates from a source other than a service provider's own wireless infrastructure or an authorized remote (e.g., mobile) station compatible with normal operation of the wireless infrastructure. The jamming signal may be transmitted from a jamming source with an omnidirectional or directional radiation pattern that yields a jamming angle of arrival relative to the antenna system 20.

The detector 26 distinguishes the jamming signal from the desired signal to permit the magnitude of the jamming signal to be measured for any given changeable null direction of the antenna system 20. The detector 26 is adapted to provide a nonlinear signal, or another suitable signal, indicative of a received magnitude of the jamming signal. The controller 28 is configured to control the antenna system 20 based upon the nonlinear signal, or another suitable signal, received from the detector 26. The controller 28 controls the antenna system 20 to spatially filter out the jamming signal from the desired signal by orienting the changeable null direction toward a jamming angle of arrival of the jamming signal relative to the antenna system 20. The controller 28 is adapted to vary the changeable null direction until the nonlinear signal is minimized or until the jamming signal amplitude is attenuated to an acceptable signal level at an output of the antenna system 20. Accordingly, the null direction may be iteratively adjusted until the magnitude of the jamming signal is at an acceptable level for generally linear operation of a receiver associated with the antenna system 20. Ideally, the iterative adjustment of the nonlinear signal continues until the nonlinear signal is minimized such that the amplitude of the jamming signal at the output of the antenna system 20 is also minimized.

In a wireless communications system, for example, a mobile station may transmit an uplink signal to a radio frequency receiver (e.g., a base station receiver) equipped with an interference protection system 10. The transmitted uplink signal represents a desired signal. During propagation, a jamming signal may interfere with the desired signal so that a received signal at the receiver may represent the jamming signal, the desired signal, or a composite of both the signals depending upon the modulation and interaction between the jamming signal and the desired signal. The received signal is received by the antenna system 20 prior to application to the receiver. The detector 26 detects the nonlinear components of the received signal that are introduced by the jamming signal. The impact of the jamming signal can be quantified by measuring the nonlinear components induced by this jamming signal. Nonlinear components may represent an amplitude distortion, or a derivative distortion thereof, of the received signal relative to the transmitted uplink signal, from which the received signal originated. The derivative distortion is not restricted to an aberrant amplitude response of the received signal within the receiver, but may degrade the desired signal in multifarious aspects (e.g., corruption of modulation).

The detector 26 detects a jamming signal by comparing a first intermediate frequency signal, which behaves relatively linearly in the presence of a jamming signal, to a second intermediate frequency signal derived from the received signal. The first intermediate frequency signal is derived from an attenuated version of the received signal to maintain linearity of the first intermediate frequency signal. The first intermediate frequency signal is adjusted to promote a destructive interference between the first intermediate frequency signal and the second intermediate frequency signal. The destructive interference reveals a nonlinear signal, or another suitable signal, indicative of the impact of the jamming signal on the received signal. The magnitude of the nonlinear signal is generally proportional to the amplitude of the jamming signal at an output port of the antenna system 20 such that the jamming signal is measurable by the controller 28.

The controller 28 provides a control signal 41 based on the measured amplitude of the jamming signal. The control signal 41 is fed back to the antenna system 20 to null these measured nonlinear components and prevent the jamming signal from coming into the circuitry of the receiver. The antenna system 20 allows the desired signal to reach the receiver if the angle of arrival of the jamming signal is sufficiently distinct from the angle of arrival of the desired signal. If the angle of arrival of the jamming signal is the same as the angle of arrival of the desired signal, the controller may provide a logic signal indicating that supplementary measures are necessary to deal with the jamming signal, such as handing off the mobile station transmitting the desired signal to a different or adjacent cell site via a base station controller. Accordingly, the interference protection system 10 reduces or eliminates disruptive interference of a jamming signal, that might otherwise intrude upon the normal operation of the communications system by promoting normal unimpeded operation of the receiver.

Figure 2:
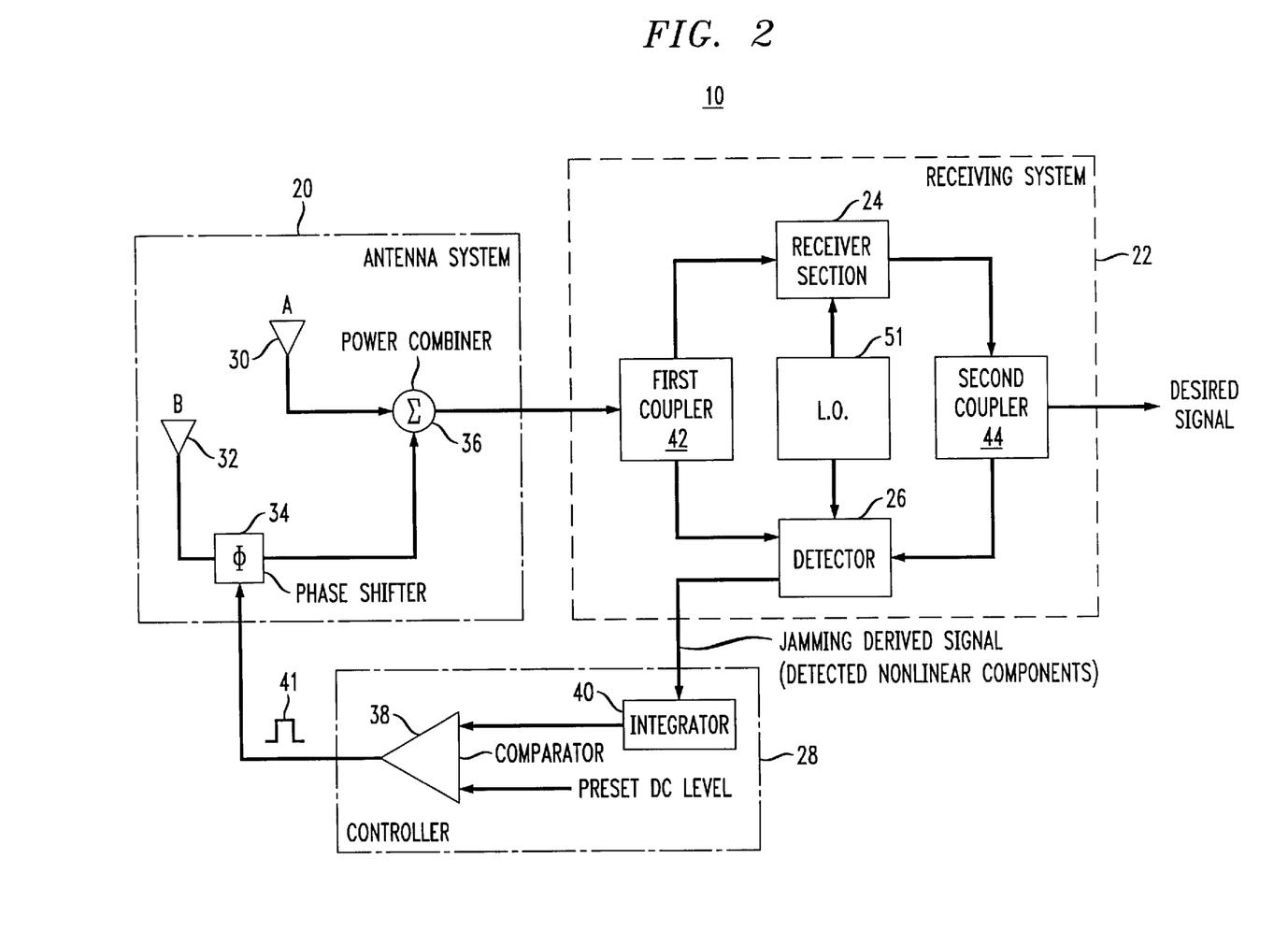
FIG. 2 shows an example of components suitable for implementing the block diagram of FIG. 1.

FIG. 2 shows an exemplary configuration of the interference protection system 10 of FIG. 1. In FIG. 2, although the antenna system 20 comprises a phased array antenna system 20, any antenna system 20 capable of changing a null direction of an antenna radiation pattern may be used. The array antenna system 20 includes at least a first antenna element 30 coupled to an antenna combiner 36 and a second antenna element 32 coupled to the antenna combiner 36 via an antenna phase shifter 34. The first antenna element 30 and the second antenna element 32 may comprise a dipole, a monopole, a collinear array, or another radiator/acceptor of electromagnetic energy. The antenna combiner 36 may comprise a hybrid combiner, a transformer combiner, or any other device for combining electromagnetic signals.

The phase shifter 34 comprises any analog or digital phase shifter for changing the phase of electromagnetic energy, such as the received signal. For example, the phase shifter 34 may comprise a switched delay-line system (e.g., a PIN diode phase shifter). A suitable switched delay line phase shifter for implementing the invention is commercially available through Vectronics Microwave Corporation (e.g., Model DP662.15HS Phase shifter.)

The phase shifter 34 has a sufficiently rapid response time to enable the receiver protection system to null the jamming signal without interrupting normal operation of the. wireless communication system. The phase shifter 34 preferably has a response time to a control signal at least as fast as 30 nanoseconds/phase step. Accordingly, if the phase shifter 34 provided 5 degree phase steps from 0 degrees to 360 degrees, the total time to scan the entire 360 degrees in phase is 72×30 nanoseconds or 2.11 microseconds.

The phase shifter 34 preferably has a sufficiently high power rating to protect against jamming signals having magnitudes less than or equal to at least 1 Kilowatt of effective radiated power within the radio frequency range of the wireless communications system. Because phase shifters are generally available with a power rating from 1 W to 200 W, the receiver protection system is readily equipped to protect against jamming signals having magnitudes even greater than 1 Kilowatt, where propagational loss of the jamming signal is considered. In practice, the jamming signal will be isolated from the antenna system 20 at least by the propagational loss associated with the distance between the antenna height (e.g., 100 meters above ground) and the ground level. In an alternate embodiment, a ferrite-based phase shifter may be used as a phase shifter for applications above 1 Kilowatt of effective radiated power from the jamming source.

Although the antenna system 20 may include two antenna elements (30, 32) as shown in FIG. 2, any number of antenna elements and phase shifters may be used to practice the invention. If the first antenna element 30 is shifted in phase with respect to the second antenna element 32, the antenna system 20 can produce a changeable null direction, which depends upon the degree of phase shift, the physical separation between the first antenna element 30 and the second antenna element 32, and the electrical length of transmission line feeding the first antenna element 30 and the second antenna element 32, among other factors. The antenna system 20 can readily null a jamming signal with one primary angle of arrival or a primary direction of arrival. The direction of arrival may be defined by an azimuth angle, a tilt angle, an azimuth angular range, a tilt angular range, or any combination of the foregoing. The jamming angle of arrival is an example of a direction of arrival. The antenna system 20, in effect, performs spatial filtering of the received signal. The phase shift of the phase shifter 34 is adjusted to change the null direction (e.g., null angle, null tilt, or both) to coincide with the jamming angle of arrival or jamming direction of the jamming signal.

The antenna system 20 is spatially selective with regards to reception of the received signal. The antenna system 20 preferably includes passive components with sufficient third intercept (IP3) performance (e.g., linearity in attenuation over a wide amplitude range of input signals) to enable normal circuit behavior even with a jamming signal amplitude less than or equal to a threshold amplitude level. The threshold amplitude level is preferably set to the strongest anticipated jamming signal amplitude.

IP3 represents a measure of the linearity of a circuit or circuit component. Two unwanted signals or an unwanted signal and a desired signal may, in effect mix in the circuit, to yield second order products and third order products. The desired signal is at a fundamental frequency. The second order products have a second order frequency related to the sum or difference between the two interacting signals. The third order products have a third order frequency of twice one frequency of one interacting signal minus the other frequency of the other interacting signal. The third order products increase in amplitude greater than the second products do for an equivalent increase in the amplitude of the desired signal.

The third order intercept is defined with reference to a graph of the input power versus the output power of a desired signal response (at the fundamental frequency) and a third order response corresponding to the desired signal response. The desired signal response and the third order response have linear segments that are extrapolated to intersect. The point of intersection is called the third order intercept, which provides a figure of merit indicative of the performance of an amplifier or receiver component with respect to intermodulation, cross-modulation, and blocking performance. If inadequate linearity (e.g., inadequate IP3 value) is provided by the receiver components, the performance of the receiver may suffer from gain compression, intermodulation distortion between unwanted signals, reciprocal mixing, blocking, cross modulation between the desired and unwanted signals, and amplitude modulation to phase-modulation conversion.

The antenna system 20 basically behaves like a spatial filter that rejects the jamming signal predominately arriving in at a jamming angle of arrival, but passes the desired signals of the mobile stations arriving from angles of arrival other than the jamming angle of arrival.

In an alternate embodiment, the antenna system may be modified to allow simultaneous filtering out of jamming signals from multiple directions. However, such a modification would require increasing the number of antenna elements. An antenna system for filtering out jamming signals from multiple directions may be unnecessary if the possibility of simultaneously receiving more than one jamming signal from different directions is considered remote.

The controller 28 is coupled to the antenna system 20 and the receiving system 22 as shown in FIG. 2. The controller 28 comprises a combination of an integrator 40 and a comparator 38. The integrator 40 averages a power of the nonlinear signal to yield an averaged nonlinear signal. The comparator 38 generates control signal 41 responsive to a comparison between the averaged nonlinear signal and a reference signal. The control signal 41 is output to the antenna system 20 from comparator 30. The control signal 41 is adapted to control the radiation pattern of the antenna system 20. In particular, the spatial filtering characteristic of the antenna system 20 is adjusted by the control signal 41 sent from the comparator 38 of the controller 28. The controller 28 interacts with a detector 26, of the receiving system 22, for detecting and measuring the strength of the jamming signal to determine a control signal 41 corresponding to a proper alignment of the jamming angle of arrival with the null direction.

The measured nonlinear signal is integrated and sent to a comparator 38, which compares its level with a preset DC reference level. The control signal 41 is used to adjust the phase shifter 34 such that the measured jamming signal indicated by the nonlinear signal is minimized at the antenna system 20. The controller 28 may change the control signal 41 to maintain maximum or otherwise adequate filtering as the jamming source moves relative to the interference protection system 10.

The controller 28 comprises a feedback system that readily reaches a stable or steady state. The reaction time represents the duration from receipt of the jamming signal at the antenna system 20 until proper orientation of the null direction. The reaction time is substantially imperceptible to a user of a mobile station if the receiving system 22, the controller 28 and the phase shifter 34 cooperate to have a sufficiently rapid overall response time. Although the components of the protection system are not necessarily limited to any particular type, if the phase shifter 34 comprises a PIN diode phase shifter and if the controller 28 uses adequately fast complementary metal oxide semiconductor (CMOS) circuits for controlling the 34 phase shifter, an overall reaction time on the order of microseconds is readily realizable for the jamming protection system. When the controller 28 reaches its steady state, the desired signals may be received without degradation and the jamming signal is filtered out by the antenna system 20. The receiver is then protected from the jamming signal and performs normally.

Figure 3:
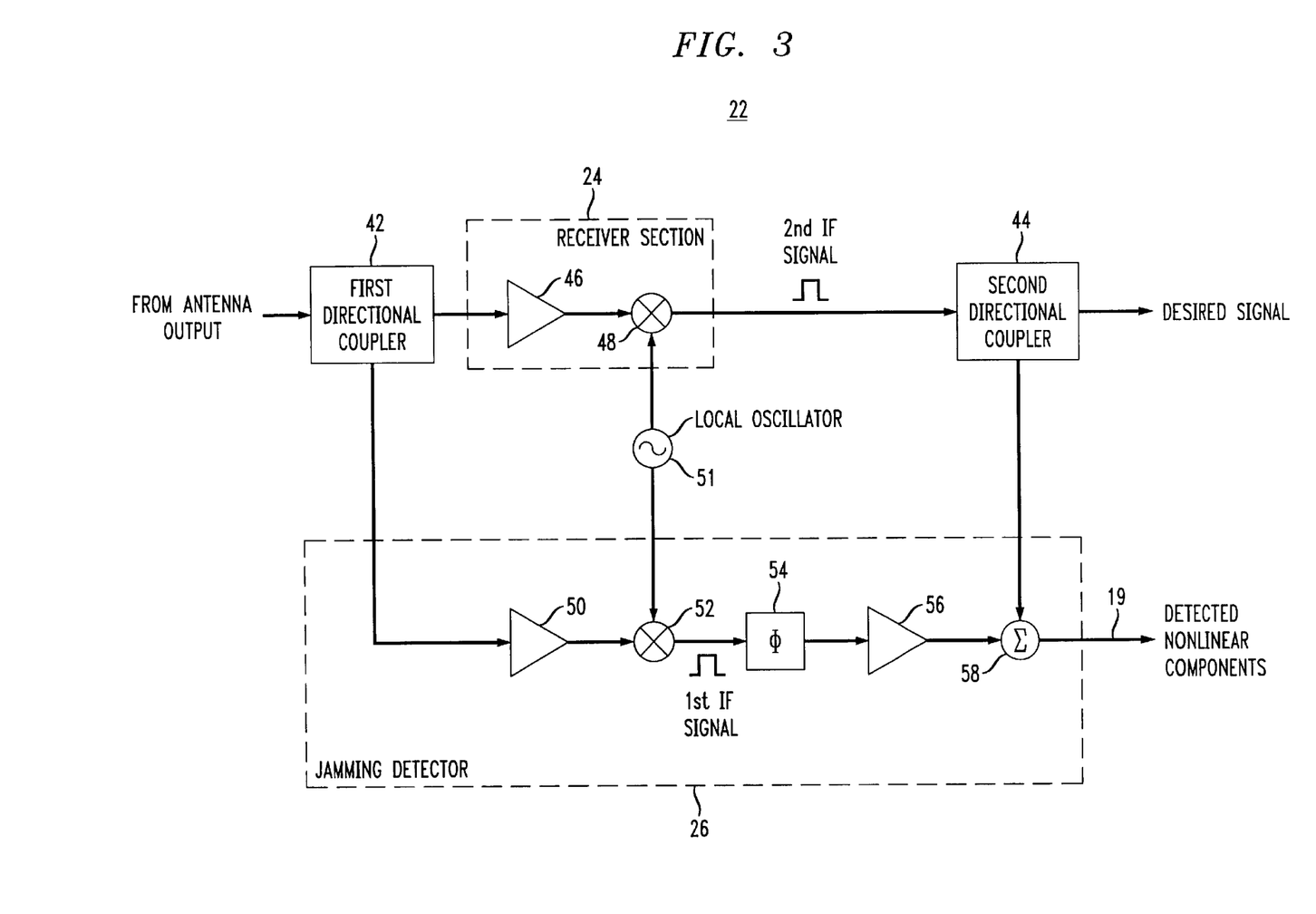
FIG. 3 shows an illustrative configuration of the receiving system of FIG. 1.

As shown in FIG. 2 and FIG. 3, a receiving system 22 generally includes a detector 26 coupled to a receiving section 24 via a first directional coupler 42 and a second directional coupler 44. A common local oscillator 51 is preferably used to feed both the detector 26 and the receiving section 24. The received signal from the antenna system 20 enters a first directional coupler 42. The first directional coupler 42 unequally distributes the received signal between the receiver section 24 and the detector 26 such that the receiver section 24 receives a stronger received signal than the detector 26. The detector 26 generally comprises a device for detecting a nonlinear signal or component of the received signal to identify the presence of the jamming signal. The receiving section 24 comprises a down-converting portion of a receiver for providing an intermediate frequency version of the desired signal.

The detector 26 is capable of detecting a jamming signal received from the antenna system 20. Further, the detector 26 can distinguish the jamming signal from the desired signal. The detector 26 is adapted to provide a nonlinear signal indicative of a received magnitude of the jamming signal. The detector 26 may comprise a feed-forward cancellation circuit for detection of nonlinear components, including a jamming signal component, of the received signal.

Referring to FIG. 3, the detector 26 includes a first amplifier 50, a mixer 52, a phase adjuster 54, a second amplifier 56, and a combiner 58. The first amplifier 50 (e.g., low-noise amplifier) amplifies a received signal from the antenna system 20 through the first directional coupler 42. The received signal comprises a desired signal, a jamming signal, a composite signal including both the desired signal and the jamming signal, or a group of interfering signals including both the desired signal and the jamming signal. The first directional coupler 42 unequally distributes the received signal between the first amplifier 50 and the receiver section 24 such that the receiver section 24 receives a stronger received signal than the first amplifier 50 and such that the first amplifier 50 predominately operates in its relatively linear region of amplification. The output of an ideal amplifier is linear, which means the input amplitude of an amplifier is directly proportional to the output amplitude of the amplifier, regardless of the absolute amplitude of the input signal or the frequency of the input signal. If the first amplifier 50 substantially approaches or attains linear operation, the output signal becomes an amplified replica of the input signal with minimal or no appreciable distortion.

The mixer 52 mixes the received signal from first amplifier 50 with a local oscillator signal from the local oscillator 51 to yield a first intermediate frequency signal. The phase adjuster 54 adjusts a phase of the first intermediate frequency signal. The second amplifier 56 (e.g., low-noise amplifier) adjusts an amplitude of the first intermediate frequency signal. The combiner 58 (e.g., radio frequency summing circuit) combines the first intermediate frequency signal with a second intermediate frequency signal from the receiver section 24, through a power coupler 28, to yield the nonlinear signal at a combiner output 19.

The receiver section 24 includes an amplifier 46 for accepting the received signal, through the first directional coupler 42, and mixer 48 for producing a second intermediate frequency signal containing the desired signal. The mixer 48 accepts an output of a local oscillator 51 to yield the second intermediate frequency. Because the local oscillator 51 feeds both the mixer 48 and the mixer 52, the first intermediate frequency signal and the second intermediate frequency signal generally occupy the same frequency and bandwidth, as shown in FIG. 3.

The receiver section 24 provides a second intermediate frequency signal to the detector 26 for comparison to the first intermediate frequency signal produced by the detector 26 to detect a nonlinear component of the second intermediate frequency signal. The second intermediate frequency signal is routed from the receiver section 24 to the combiner 58 via the second directional coupler 44. The first directional coupler 42 and the second directional coupler 44 each may comprise a waveguide coupler, a monolithic coupler, or the like. In an alternate embodiment, each of the first directional coupler 42 and the second directional coupler 44 may be replaced with a radio frequency transformer.

The detector 26 adjusts a phase of the first intermediate frequency signal to be approximately 180 degrees out of phase with respect to the second intermediate frequency. The detector 26 adjusts an amplitude of the first intermediate frequency signal to be approximately equal to an amplitude of the second intermediate frequency signal. If the phases and the amplitudes of the first intermediate frequency signal and the second intermediate signal are appropriately adjusted as described above, the linear components of the first intermediate frequency signal and the second intermediate frequency signal will cancel after combining at the combiner 58. Therefore, once the first intermediate frequency signal and the second intermediate frequency signal are summed, or otherwise combined, the resultant nonlinear signal represents detectable nonlinear components of the second intermediate signal at the combiner output. The detectable nonlinear components may be measured to provide an indication of the degree of interference from the jamming signal.

Figure 4:
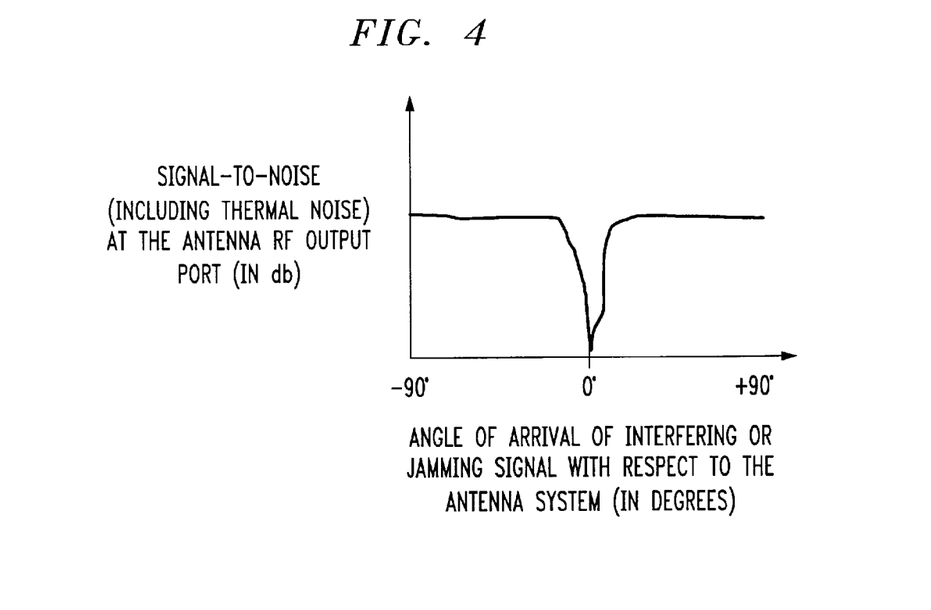
FIG. 4 shows a filtering response of an antenna system in terms of signal-to-noise ratio (including thermal noise) versus angle of arrival.

FIG. 4 is a graph of signal-to-noise ratio (including thermal noise) versus angle of arrival of electromagnetic energy at the antenna system 20. A vertical axis represents the signal-to-noise ratio including thermal noise. A horizontal axis represents an angle of arrival of electromagnetic energy ranging from −90 degrees to +90 degrees in an azimuthal plane. The azimuthal plane is a generally horizontal plane, which may be modeled as having a curvature commensurate with the earth's curvature. Here, a null direction of the antenna system 20 is located at 0 degrees in the azimuthal plane for illustrative purposes. If the null direction coincides with or approximately equals the jamming angle of arrival of the jamming signal, the antenna system 20 operates as a spatial notch filter to enhance reception performance in the wireless communications system.

Figure 5:
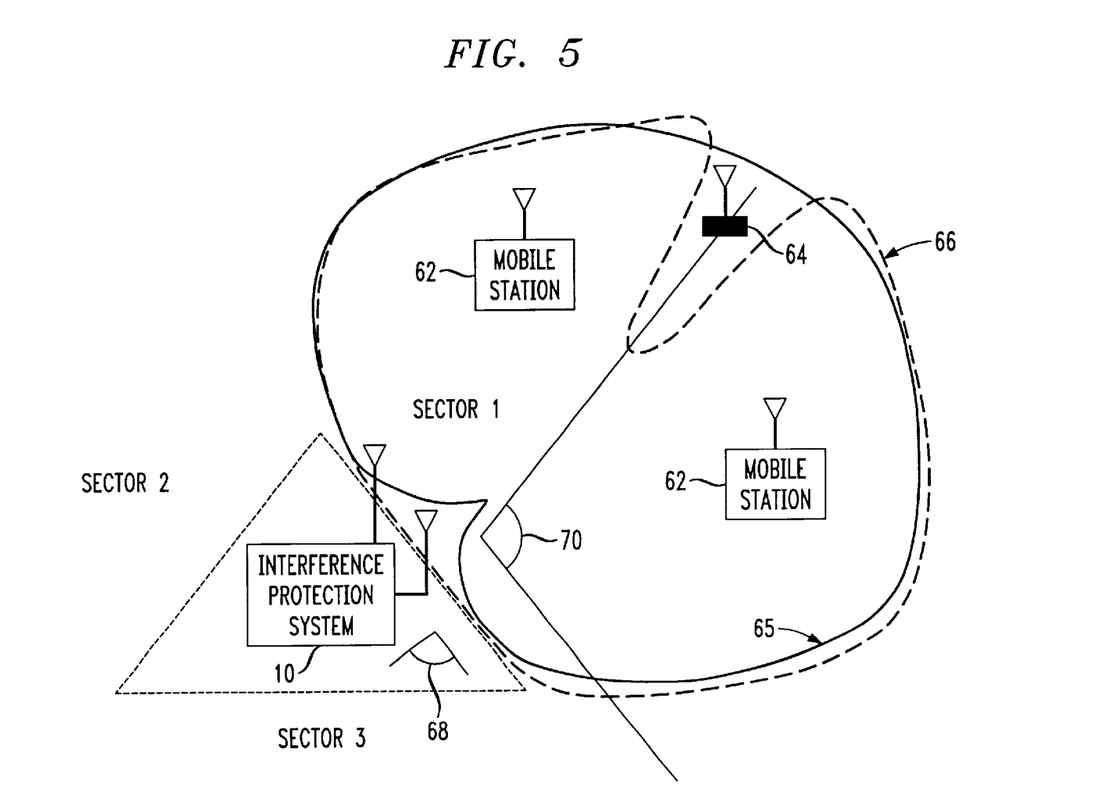
FIG. 5 illustrates operation of the interference protection system in a communications system.

FIG. 5 shows the operation of an illustrative communications system. Although FIG. 5 illustrates an interference protection system 10 dedicated to one-sector of a three-sector cell site, the interference protection system 10 may be applied to any type of communications site regardless of the initial pre-interference coverage pattern, so long as the post-interference coverage pattern has at least one null direction for reducing interference.

The communication system includes an interference protection system 10 coupled to a base station at a base station site and mobile stations 62 distributed throughout a geographic coverage area served by the base station. Mobile stations 62 comprise transceivers for electromagnetically transmitting to a base station at the base station site and for electromagnetically receiving from the base station site. The interference protection system 10 acts as an intermediary between the mobile stations 62 and the base station to prevent or reduce jamming interference associated with a jamming signal source 64. The jamming signal source 64 operates on a frequency so as to interfere with the uplink transmissions from the mobile station 62 to the base station. For example, the jamming signal source 64 may operate within a same frequency range as the uplink transmission.

FIG. 5 shows a change in the antenna radiation of the antenna system 20 from a first radiation pattern 65, indicated by a solid line, to a second radiation pattern 66 indicated by the dashed line. Although the first radiation pattern 65 and the second radiation pattern 66 both represent cardioid radiation pattern shapes with approximately 90 degree half-power beam-width in the horizontal plane, other radiation patterns having at least one null fall within the scope of post-interference coverage patterns of the invention.

The first radiation pattern 65 represents a receive radiation pattern of the antenna system 20 prior to filtering out the jamming signal from the received signal. The second radiation pattern 66 represents a receive radiation pattern of the antenna system 20 after filtering out the jamming signal from the received signal in accordance with the invention. The first radiation pattern 65 has a first null direction 68 facing a direction irrespective of the jamming signal source 64 location or a jamming angle of arrival of the jamming signal. On the other hand, the second radiation pattern 66 has a second null direction 70 facing a direction of the jamming signal source 64 or a jamming angle of arrival of the jamming signal to attenuate the jamming signal prior to reception by the base station.

Figure 6:
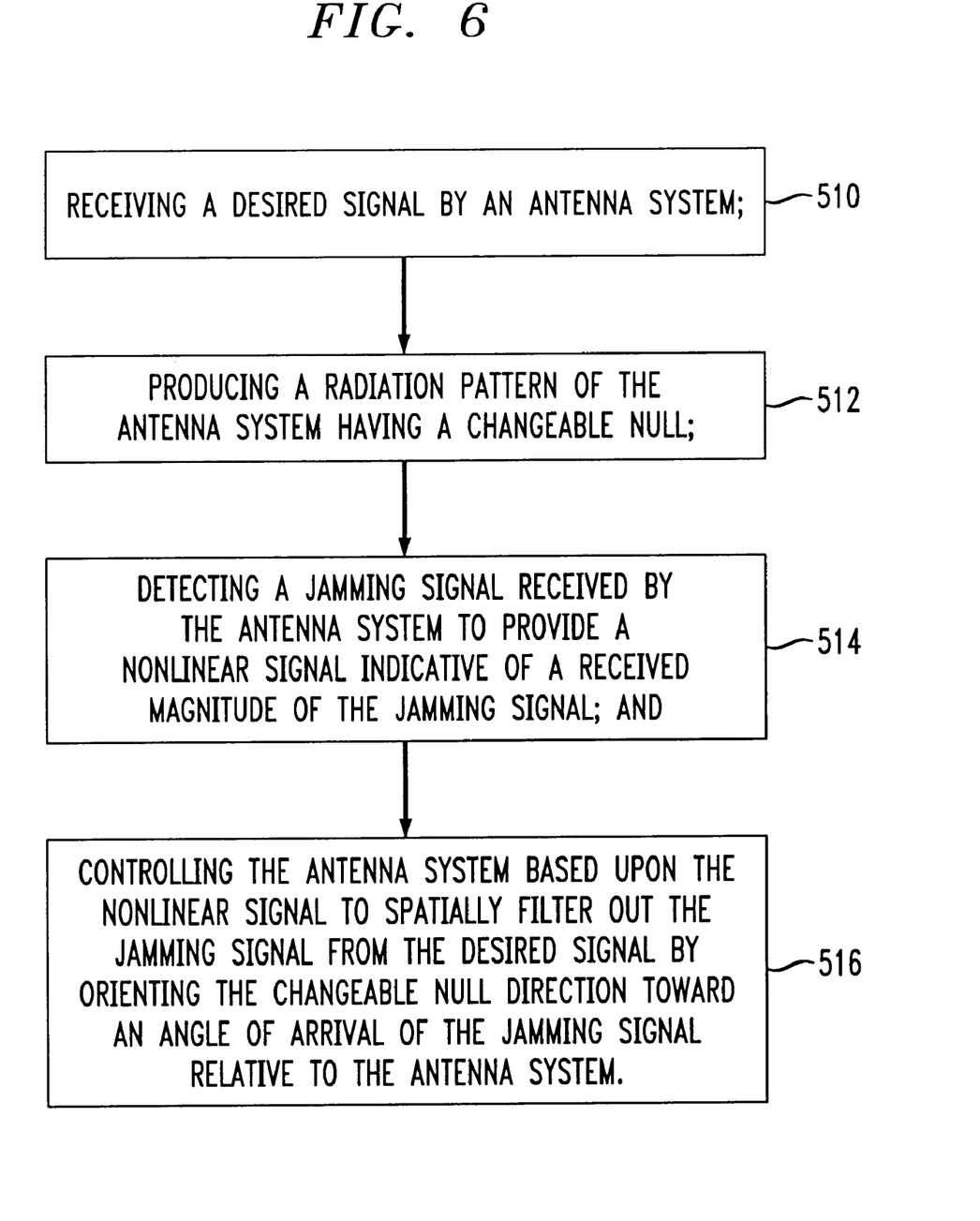
FIG. 6 is a flow diagram of a method of protecting a receiver from jamming interference in accordance with the method.

A method for protecting a receiver from interference, as shown in FIG. 6, reduces or eliminates interference which would otherwise detract from the performance of the receiver at a wireless infrastructure site. Fundamentally, the method includes producing a signal indicative of a magnitude of a received jamming signal and adjusting a null direction of an antenna system 20 using the produced signal.

Starting with step S10, an antenna system 20 receives a received signal. The received signal includes a desired signal and may include a jamming signal. In step S12, the antenna system 20 produces a radiation pattern having a changeable null direction. The antenna system 20 may produce different radiation patterns, or generally equivalent radiation patterns that are oriented differently with respect to a reference azimuth (e.g., zero degrees or due North).

In step S14, if a jamming signal is present in the received signal, a detector 26 detects the jamming signal received by the antenna system 20 to provide a nonlinear signal indicative of a received magnitude of the jamming signal. The detecting further comprises distributing the received signal from the antenna system 20. The received signal is unequally distributed between the receiver section 24 and the first amplifier 50 such that the receiver section 24 receives a stronger received signal than the first amplifier 50 and such that the amplifier predominately operates in its relatively linear region of amplification.

Detecting the jamming signal includes amplifying a received signal from the antenna system 20 at an amplifier. A mixer 48 mixes the received signal with a local oscillator signal to yield a second intermediate frequency signal. A phase adjuster 54 adjusts an instantaneous phase of a first intermediate frequency signal to be out of phase with respect to an instantaneous phase of the second intermediate frequency signal. An amplifier 56 adjusts an amplitude of the first intermediate frequency signal to be approximately equivalent to an amplitude of the second intermediate frequency signal. A second intermediate frequency signal is provided for comparison to a first intermediate frequency signal to detect a nonlinear component of the second intermediate frequency signal. A combiner 58 combines the first intermediate frequency signal with the second intermediate frequency signal from a receiver section 24 to yield the nonlinear signal.

Finally, in step S16, a controller 28 controls the antenna system 20 based upon the nonlinear signal to spatially filter out the jamming signal from the desired signal by orienting the changeable null direction toward a jamming angle of arrival of the jamming signal relative to the antenna system 20. In general, controlling the antenna system 20 includes varying the changeable null direction for a transparent time to users until the nonlinear signal is minimized. The controlling of the antenna system 20 includes averaging a power of the nonlinear signal to yield an averaged nonlinear signal. Further, a control signal 41 is generated in response to a comparison between the averaged nonlinear signal and a reference signal. The control signal 41 is adapted to control the radiation pattern of the antenna system 20 to filter out the jamming signal, while passing one or more of the desired signals, from mobile stations in the wireless communications system, to the receiver. For example, the output control signal 41 may be configured to scan the phase shift of the phase shifter 34 throughout a range of different phase states until the jamming signal is minimized in received amplitude at an antenna output port of the antenna system 20. In practice, the range of different phase states will depend upon the characteristics of the antenna system 20 and the permissible radio frequency coverage (e.g., a three-sector configuration or an omnidirectional configuration) associated with the antenna system 20.

Figure 7:
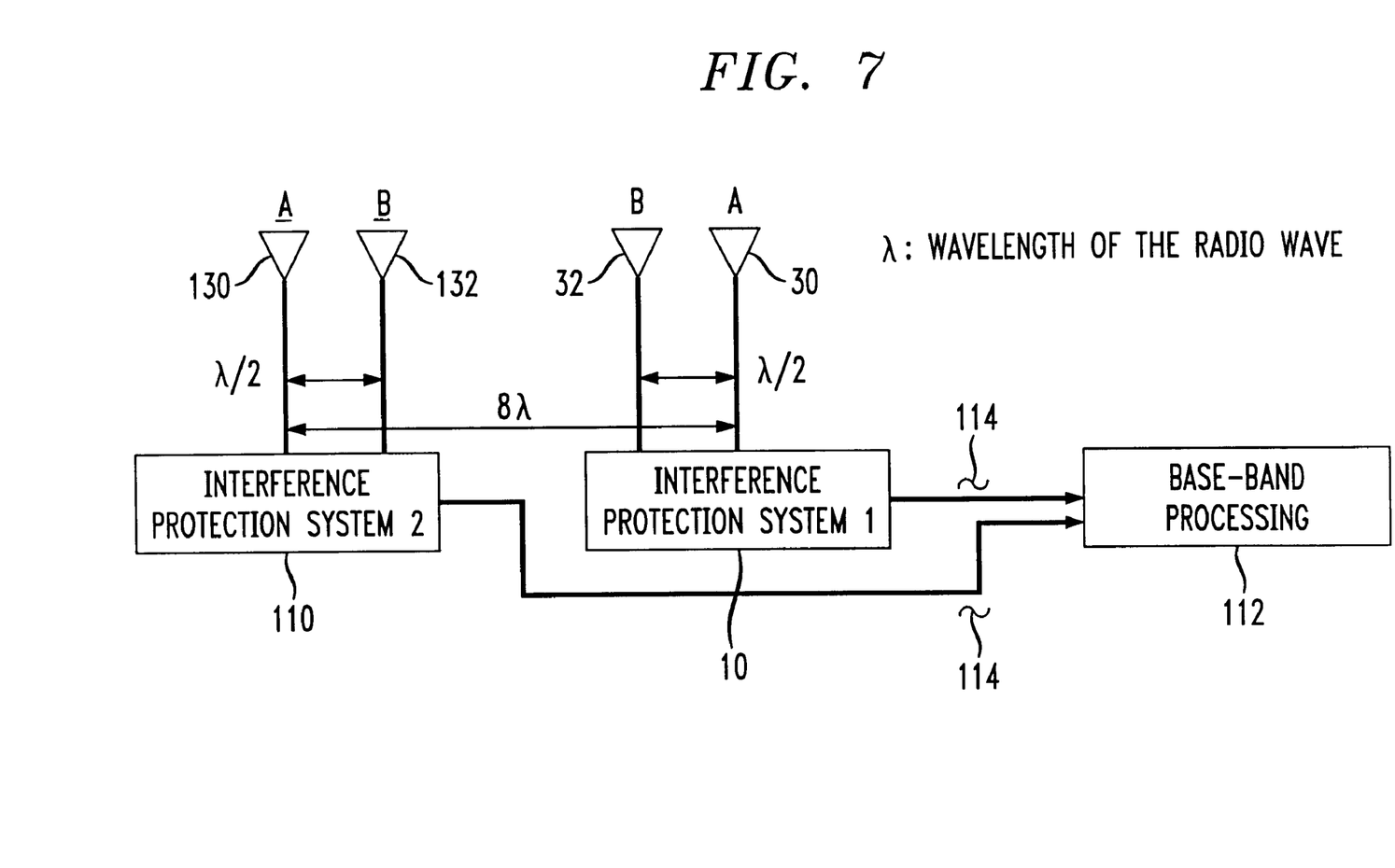
FIG. 7 is a block diagram illustrating an interference protection system applied to a space-diversity receiving arrangement in accordance with the invention.

FIG. 7 illustrates an application of the interference protection system of FIG. 1 to a space-diversity receiver configuration. Like reference numerals in FIG. 7 and FIG. 1 indicate equivalent elements. The space-diversity receiver configuration includes a first interference protection system 10 and a second interference system 110, which is substantially identical to the first interference protection system 10. The first interference protection system 10 and the second interference protection system 110 individually function in the manner previously described in conjunction with FIG. 1 through FIG. 3.

The first interference protection system 10 includes the first antenna element 30 and the second antenna element 32 which are typically spaced apart by one wavelength or less (e.g., one-half wavelength) at a frequency range of operation to attain an appropriate radiation pattern or null direction thereof. Similarly, the second interference protection system 110 includes a third antenna element 130 and a fourth antenna element 132, which are typically spaced apart by one wavelength or less at a frequency range of operation to attain an appropriate radiation pattern or null direction thereof. The first antenna element 30 and the third antenna 130 element have a spacing of multiple wavelengths (e.g., eight wavelengths) at the frequency of operation (e.g., frequency of the desired signal) sufficient to realize diversity gain by synchronously combining a first received signal and a second received signal, or derivatives of the foregoing signals. The first received signal is associated with the first antenna element 30 and the second antenna element 32 after combining by the power combiner 36, whereas the second received signal is associated with the third antenna element 130 and the fourth antenna element 132.

The first interference protection system 10 and the second interference protection system 110 are coupled to a base-band processing system 112. The first interference protection system 10 and the second interference protection system 110 provide desired signals 114 to the base-band processing system 112 for synchronous combining of the desired signals 114 to realize spatial diversity gain in the reception. The first interference protection system 10 and the second interference protection system 110 achieve spatial diversity gain, while providing interference protection as previously described in conjunction with FIG. 1 through FIG. 3.

Figure 8:
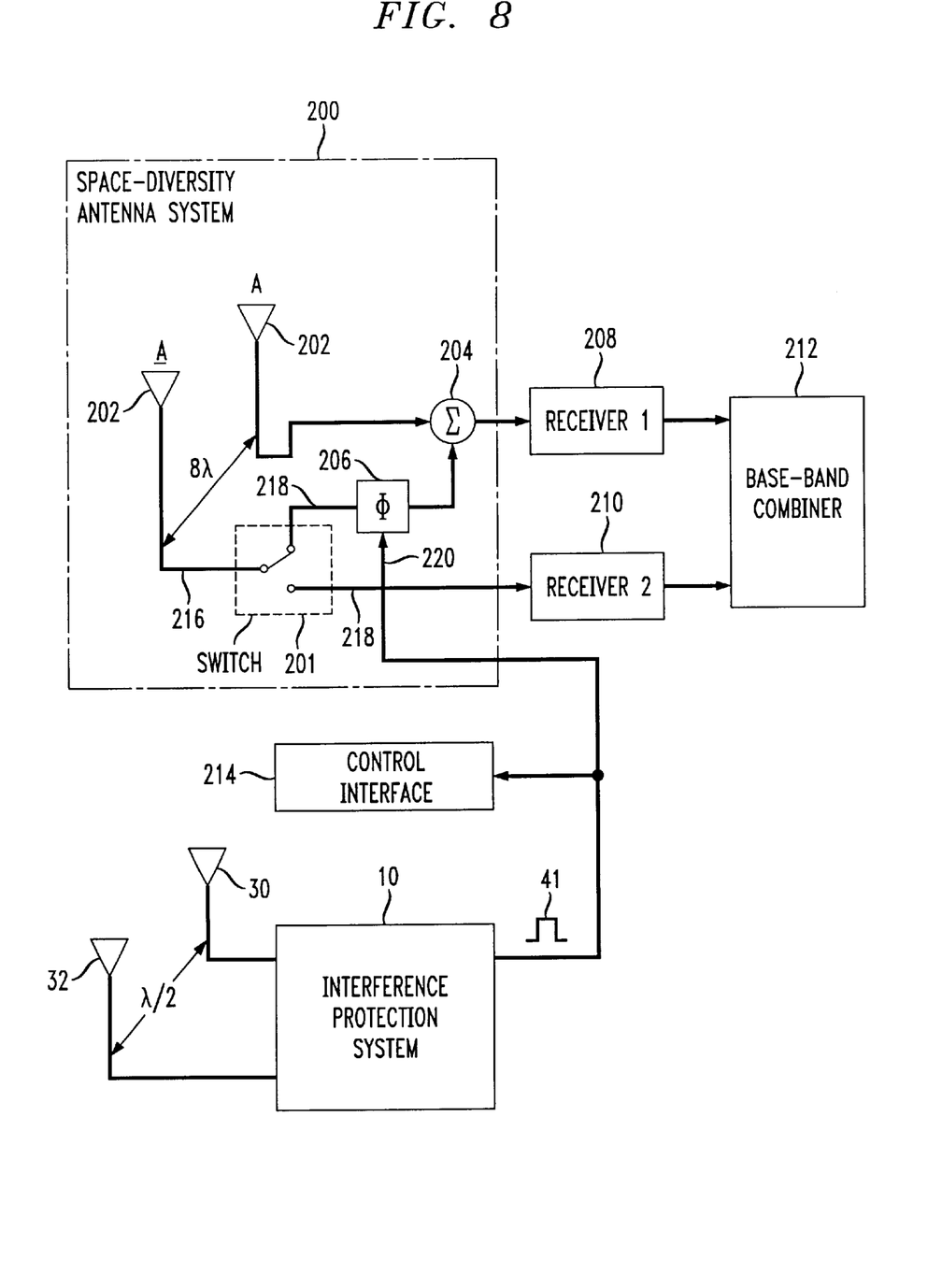
FIG. 8 is a block diagram illustrating an interference protection system applied to space-diversity receiving arrangement in accordance with the invention.

FIG. 8 illustrates another application of the interference protection system 10 of FIG. 1 to a space-diversity receiver configuration. The interference protection system 10 is generally equivalent to that of FIG. 1. Space-diversity receivers are prevalent in many digital wireless communication system. Thus, FIG. 8 provides a pragmatic example of how the interference protection system 10 may be used.

The space-diversity receiver configuration includes a space-diversity antenna system 200 for feeding a first receiver 208 and a second receiver 210, a base-band combiner 212 coupled to the first receiver 208 and the second receiver 210, and an interference protection system 10 coupled to the space-diversity antenna system 200. The space-diversity antenna system 200 comprises a plurality of antenna elements 202 separated by a distance suitable to provide diversity gain. The space-diversity antenna system 200 further includes a phase shifter 206 and a combiner 204 which are coupled to the antenna elements 202 in a suitable manner to produce a radiation pattern with a changeable null direction. The first receiver 208 and the second receiver 210 preferably operate within the same frequency range such that received signals from a common source may be combined a the base-band combiner 212 to yield a gain in signal strength or a reduction in fading. However, during the reception of a jamming signal, the base-band combiner 212 does not yield diversity gain in the configuration of FIG. 8. The control signal 41 from the interference protection system 10 is used to the control phase shifter 34 within the interference protection system as well as a phase shifter 206 associated with the space-diversity antenna system 200. Further, the control signal 41 preferably provides a predecessor for the provision of the jamming detection signal by the control interface 214.

The space-diversity antenna system 200 further includes a radio frequency switch 201. The radio frequency switch 201 is adapted to switch 201 reception between a space-diversity mode, in which space-diversity gain may be realized, and an interference reduction mode, in which a jamming signal is reduced in amplitude through spatial filtering of the space-diversity antenna system 200. The switch 201 includes a radio frequency input port 216, radio frequency output ports 218, and a control terminal 220. Only one of the output ports 218 is hot (active) at a time. That is, the radio frequency input port 216 is either coupled to the phase shifter 206 during the filtering of the jamming signal or to the second receiver 210 when the jamming signal is absent. The radio frequency switch 201 is controlled by controller 28 via the control interface 214.

The control interface 214 provides a jamming detection signal indicative of the presence or absence of the jamming signal to control the state of the switch 201. The jamming detection signal is preferably a logic signal or another signal suitable for controlling the state of the switch 201. The interference protection system cooperates with the control interface 214 to command the switch 201 to select the space diversity mode in the absence of a jamming signal and the interference reduction mode in the presence of a jamming signal. In an alternate embodiment, the control interface 214 may be integrated into the functionality of a controller, otherwise equivalent to controller.

In accordance with the invention, the interference protection system (e.g., 10) and method, detects the presence of a jamming signal and rejects the jamming signal at a radio frequency input of the receiver before disrupting normal receiver operation. The jamming signal is rejected, while maintaining linear operation of the base station receiver in which most of the users of mobile stations are able to communicate normally with the base station protected by the interference protection system.

The interference protection system (e.g., 10) is well-suited for construction with components that can stand much higher power than the active receive circuits of many commercially available base stations. Further because base-band processing of the received signal is not necessary to attenuate the jamming signal, the interference protection method is well-suited for protection against ultra strong jamming signals (e.g., jamming signals exceeding −20 dBm). The interference protection system (e.g., 10) allows a wireless system to be protected against microwave hostile jamming signal that could paralyze the cellular operations. The protection against the jamming signal can be activated fast enough such that the whole operation is transparent to the users of the mobile stations. Therefore, the interference protection system can provide reliable and effective jamming protection for the wireless receiver.

Although the system and method of the invention has been described primarily as an adjunct to a base station or receiver system at a fixed end site, the system and method of the invention may also be applied to receivers or transceivers of mobile stations to reduce interference to downlink transmissions to the mobile stations from the base station. Mobile receivers are often designed with high linearity (e.g., high IP3 performance) to receive both desired signals and unwanted interference from other communication systems. For instance, narrow band interference signals from Global System for Mobile Communications (GSM), time-division multiple access (TDMA) and Advanced Mobile Phone Service (AMPS) at a code-division multiple-access (CDMA) mobile receiver can be much stronger than the desired signal CDMA signal. In a conventional design, the receiver front-end ( e.g., low noise amplifier and mixer) is designed with a high enough linearity to adequately receive both the desired and unwanted signals. The unwanted signals are rejected at the intermediate frequency stage of the radio, as opposed to the front-end. For example, the intermediate frequency stage may have a filter tuned to notch out the second and third order product frequencies, while passing the frequency bandwidth of the desired signal.

Figure 9:
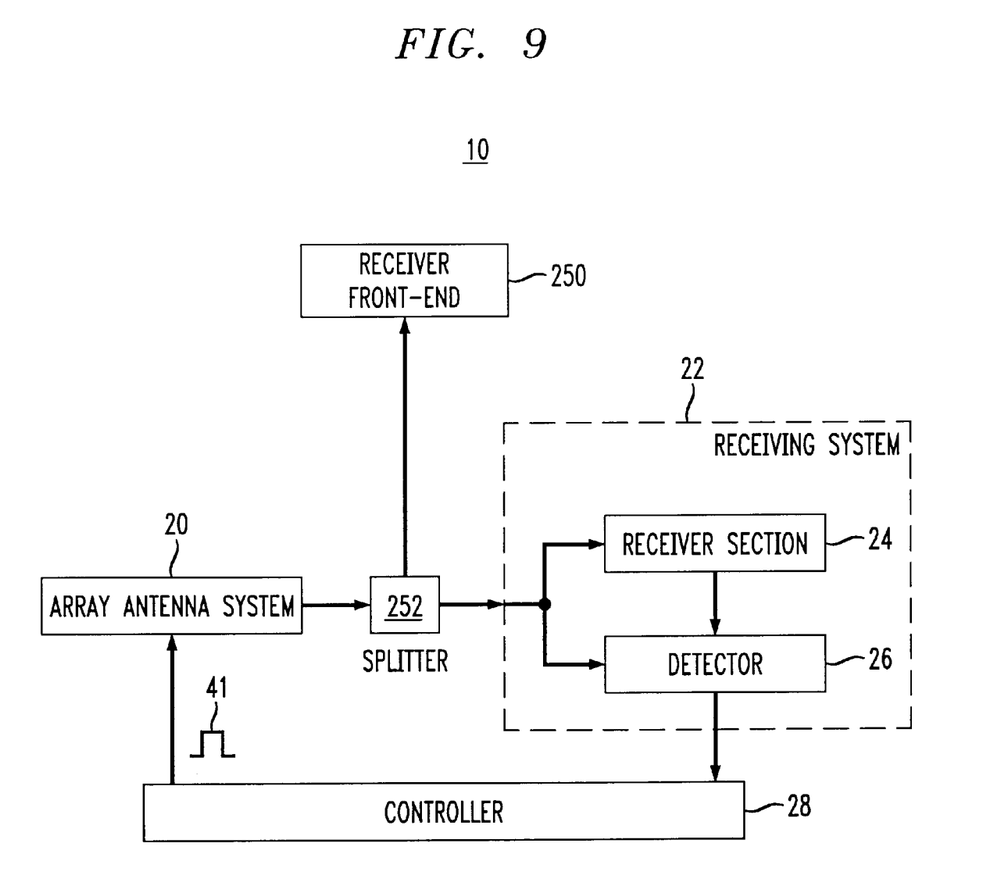
FIG. 9 is a block diagram illustrating an interference protection system being used to protect a receiver front-end from jamming interference.

FIG. 9 illustrates the use of the receiver protection system with receiver front-end 250 coupled to the antenna system 20 via a splitter 252. Like reference numerals in FIG. 1 and FIG. 9 indicate equivalent elements of the receiver protection system 10. If the receiver front-end 250 merely requires sufficient linearity to receive the desired signal, as opposed to both the desired and unwanted signals, the receiver front-end 250 is readily designed to consume less power corresponding to the lesser requirement for linearity of the receiver circuits. In accordance with the present invention, the interference protection system attenuates or filters the jamming signal to enable the receiver front-end 250 to use circuitry having a linearity performance rating (e.g., IP3) merely sufficient to accommodate the desired signal. If the linearity requirement of an amplifier in the receiver front-end 250 is reduced, current consumption of the amplifier may be reduced. Each 3 dB decrease in the linearity requirement can potentially translate into a reduction from twenty to fifty percent in power consumption of an amplifier in the receiver front-end 250. Accordingly, incorporating the interference protection system into a mobile receiver would promote a receiver design with less power consumption and greater battery life, even including a discount in the saved power consumption for powering the interference protection system itself. While the angle of arrival of the jamming signal is different from than the angle of arrival of the desired signal, the power consumption of the mobile receiver may be reduced through the interference protection system of the invention. In an alternate embodiment, the receiver is equipped with a dynamic linearity control which adjusts the maximum linearity performance of the receiver or receiver front-end based upon whether or not the jamming signal is present or whether or not the interference protection system is sufficiently effective at reducing or eliminating interference from the jamming signal.

In practice, the interference protection system may be integrated into a receiver of a wireless base station or a wireless mobile station and sold separately from an antenna system which the interference protection system controls. Accordingly, the interference protection system includes at least a detector for detecting a jamming signal and a controller for controlling an antenna system based on the jamming signal consistent with the control scheme of the antenna system.

This specification describes various illustrative embodiments of the system and method of the present invention. The scope of the claims is intended to cover various modifications and equivalent arrangements of the illustrative embodiments disclosed in the specification. Therefore, the following claims should be accorded the reasonably broadest interpretation to cover the modifications, equivalent structures, and features which are consistent with the spirit and the scope of the invention disclosed herein.

What is claimed is:

1. An interference protection system for use with an antenna system, the interference protection system comprising:
   a detector configured to receive at least an RF signal and for producing a nonlinear signal indicative of a received magnitude of a jamming signal based on the RF signal; and
   a controller using the nonlinear signal to spatially filter out the jamming signal by orienting a changeable null direction of the antenna system toward an angle of arrival of the jamming signal relative to the antenna system.

2. The interference protection system according to claim 1 wherein the controller is adapted to vary the changeable null direction until the nonlinear signal is minimized.

3. The interference protection system according to claim 1 wherein the controller is adapted to vary a direction of the changeable null until an amplitude of a jamming signal has an acceptable level with respect to a desired signal.

4. The interference protection system according to claim 1 wherein the detector is operable to detect the jamming signal and to distinguish the jamming signal from a desired signal.

5. The interference protection system according to claim 1 further comprising an antenna system for producing a radiation pattern having the changeable null direction while simultaneously receiving a desired signal.

6. The interference protection system according to claim 1 further comprising:
   a receiver section for receiving the desired signal from the antenna system;
   a coupler for unequally distributing the received signal between the receiver section and the detector such that the receiver section receives a stronger received signal than the detector and such that the detector predominately operates in its linear region of amplification.

7. The interference protection system according to claim 1 wherein the controller comprises:
   an integrator for averaging a power of the nonlinear signal to yield an averaged nonlinear signal; and
   a comparator for generating an output control signal responsive to a comparison between the averaged nonlinear signal and a reference signal, the output control signal adapted to control the radiation pattern of the array antenna system.

8. The interference protection system according to claim 1 further comprising:
   a receiver front-end for receiving a desired signal from the antenna system, the receiver front-end having a linearity performance rating suitable for a maximum signal amplitude of a desired signal at an output of the antenna system.

9. The interference protection system according to claim 1 further comprising:
   a receiver front-end coupled to an output of the antenna system and having an amplifier with a third order intercept point suitable for a maximum signal amplitude of a desired signal from the antenna system to minimize power consumption of a mobile communications device incorporating the receiver front-end, the detector, and the controller.

10. An interference protection system for a receiver, the system comprising:
    an antenna system for producing a radiation pattern having a changeable null and for receiving a desired signal, the desired signal including at least an RF signal;
    a detector configured to receive at least the desired signal, the desired signal being a pre-demodulated signal, detect a jamming signal received by the antenna system, distinguish the jamming signal from the desired signal, produce a nonlinear signal indicative of a received magnitude of the jamming signal based on the RF signal; and
    a controller for controlling the antenna system, the controller using the nonlinear signal to spatially filter out the jamming signal from the desired signal by orienting the changeable null toward an angle of arrival of the jamming signal relative to the antenna system.

11. The interference protection system according to claim 10 wherein the controller is adapted to vary a direction of the changeable null until the nonlinear signal is minimized.

12. The interference protection system according to claim 10 wherein the detector comprises:

a first amplifier for amplifying a received signal from the antenna system, the received signal including at least one of the desired signal and the jamming signal;

a mixer for mixing the received signal with another signal to yield an intermediate frequency signal;

a phase adjuster for adjusting phase of the intermediate frequency signal;

a second amplifier for adjusting an amplitude of the intermediate frequency signal; and a combiner for combining the intermediate frequency signal with another intermediate frequency signal from a receiver section to yield the nonlinear signal.

13. The interference protection system according to claim 12 further comprising:

a coupler for unequally distributing the received signal between the receiver section and the first amplifier such that the receiver section receives a relatively stronger received signal than the first amplifier and such that the first amplifier predominately operates in its linear region of amplification.

13. The interference protection system according to claim 12 further comprising:

a coupler for unequally distributing the received signal between the receiver section and the first amplifier such that the receiver section receives a relatively stronger received signal than the first amplifier and such that the first amplifier predominately operates in its linear region of amplification.

14. The interference protection system according to claim 10 wherein the controller comprises:

an integrator for averaging a power of the nonlinear signal to yield an averaged nonlinear signal; and a comparator for generating an output control signal responsive to a comparison between the averaged nonlinear signal and a reference signal, the output control signal adapted to control the radiation pattern of the antenna system.

15. The interference protection system according to claim 10 further comprising a receiving system including the detector and a receiver section, the receiver section including an amplifier and a mixer for accepting the received signal and producing an intermediate frequency signal containing the desired signal.

16. The interference protection system according to claim 10 further comprising a receiving system including the detector and a receiver section, the receiver section coupled to the detector via a coupler for distributing the received signal from the antenna system, the receiver section providing a second intermediate frequency signal to the detector for comparison to a first intermediate frequency signal produced by the detector to detect a nonlinear component of the second intermediate frequency signal.

17. An interference protection system for a receiver, the system comprising:

an array antenna system for producing a radiation pattern having a changeable null for receiving a desired signal, the desired signal including at least an RF signal, the antenna system including a first antenna element coupled to an antenna combiner and a second element coupled to the antenna combiner via an antenna phase shifter;

a receiver system including a detector configured to receive at least the desired signal, including the RF signal, and for detecting a jamming signal from the desired signal, the detector adapted to provide a nonlinear signal indicative of the received magnitude of the jamming signal; and a controller for controlling the array antenna system based upon the nonlinear signal to spatially filter out the jamming signal from the desired signal by orienting the changeable null toward an angle of arrival of the jamming signal relative to the array antenna system.

18. The interference protection system according to claim 17 wherein the receiving system includes a receiver section for receiving the desired signal and a coupler for unequally distributing the received signal between the receiver section and the first amplifier such that the receiver section receives a stronger received signal than the first amplifier and such that the first amplifier predominately operates in its linear region of amplification.

19. The interference protection system according to claim 17 wherein the receiving system includes a receiver section having a receiving amplifier and a receiving mixer for accepting the received signal and producing an intermediate frequency signal containing the desired signal.

20. The interference protection system according to claim 17 wherein the receiving system further includes a receiver section coupled to the detector via a coupler for distributing the received signal from the antenna system, the receiver section providing a second intermediate frequency signal to the detector for comparison to a first intermediate frequency signal produced by the detector to detect a nonlinear component of the second intermediate frequency signal.

21. The interference protection system according to claim 20 wherein the detector adjusts a phase of the first intermediate frequency signal to be approximately 180 degrees out of phase with respect to the second intermediate frequency and wherein the detector adjusts an amplitude of the first intermediate frequency signal to be approximately equal to an amplitude of the second intermediate frequency signal.

22. A method for reducing interference presented to a receiver, the method comprising:

receiving at least an RF signal at a detector;

producing, by the detector, a nonlinear signal indicative of a magnitude of a received jamming signal based on the received RF signal; and using, by a controller, the nonlinear signal to spatially filter out the jamming signal by orienting a changeable null direction of the antenna system toward an angle of arrival of the jamming signal relative to the antenna system.

23. The method of claim 22 wherein the adjusting step is iteratively performed until the magnitude of the jamming signal is at an acceptable level for the receiver to operate generally linearly.

24. The method of claim 22 wherein the adjusting step comprises orienting the null direction toward an angle of arrival of the jamming signal relative to the antenna system.

25. A method of protecting a receiver from interference comprising the steps of:

receiving a desired signal by an antenna system, the received desired signal being a pre-demodulated RF signal;

receiving, by a detector, at least the pre-demodulated RF signal;

detecting a jamming signal received by the antenna system;

producing, by the detector, a nonlinear signal indicative of a received magnitude of a jamming signal based on the pre-demodulated RF signal; and controlling, by the controller, the antenna system using the nonlinear signal to spatially filter out the jamming signal from the desired signal by orienting a changeable null direction of the antenna system toward an angle of arrival of the jamming signal relative to the antenna system.

26. The method according to claim 25 wherein the controlling step includes varying the changeable null direction until the nonlinear signal is minimized.

27. The method according to claim 25 wherein the detecting step further comprises:
    amplifying a received signal from the antenna system at an amplifier, the received signal including at least one of the desired signal and the jamming signal;
    mixing the received signal with a local oscillator signal to yield a first intermediate frequency signal,
    adjusting an instantaneous phase of the first intermediate frequency signal to be out of phase with respect to an instantaneous phase of a second intermediate frequency signal;
    adjusting an amplitude of the first intermediate frequency signal to be approximately equivalent to an amplitude of the second intermediate frequency signal; and
    combining the first intermediate frequency signal with the second intermediate frequency signal from a receiver section to yield the nonlinear signal.

28. The method according to claim 27 further comprising the step of:
    unequally distributing the received signal between the receiver section and the amplifier such that the receiver section receives a stronger received signal than the amplifier and such that the amplifier predominately operates in its linear region of amplification.

29. The method according to claim 25 wherein the controlling step comprises:
    averaging a power of the nonlinear signal to yield an averaged nonlinear signal; and
    generating an output control signal responsive to a comparison between the averaged nonlinear signal and a reference signal, the output control signal adapted to control the radiation pattern of the antenna system.

30. The method according to claim 25 further comprising:
    accepting the received signal and producing an intermediate frequency signal containing the desired signal.

31. The method according to claim 25 wherein the detecting step further comprises:
    distributing the received signal from the antenna system; and
    providing a second intermediate frequency signal for comparison to a first intermediate frequency signal to detect a nonlinear component of the second intermediate frequency signal.

32. The method according to claim 25 further comprising:
    arranging a second antenna system spaced apart from the antenna system an amount sufficient to provide diversity gain between the second antenna system and the antenna system.

33. The method according to claim 25 further comprising:
    providing a signal reception path having space-diversity gain in the absence of any detected jamming signal.

34. The method according to claim 25 further comprising:
    providing a signal reception path with attenuation of the jamming signal and without space-diversity gain in the presence of the detected jamming signal.

* * * * *

UNITED STATES PATENT AND TRADEMARK OFFICE
CERTIFICATE OF CORRECTION

PATENT NO. : 6,704,557 B1
DATED : March 9, 2004
INVENTOR(S) : Sreenath Krishnamurthy, Chun Chieh Kung and Kun-Yii Tu It is certified that error appears in the above-identified patent and that said Letters Patent is hereby corrected as shown below:

<u>Column 14,</u>
Line 66, Claim 12 should read:
    12. The interference protection system according to claim 10 wherein the detector comprises:
    a first amplifier for amplifying a received signal from the antenna system, the received signal including at least one of the desired signal and the jamming signal;
    a mixer for mixing the received signal with another signal to yield an intermediate frequency signal;
    a phase adjuster for adjusting phase of the intermediate frequency signal;
    a second amplifier for adjusting an amplitude of the intermediate frequency signal; and
    a combiner for combining the intermediate frequency signal with another intermediate frequency signal from a receiver section to yield the nonlinear signal.

Signed and Sealed this

Twenty-fourth Day of January, 2006

JON W. DUDAS
*Director of the United States Patent and Trademark Office*